United States Patent [19]

Hosoya

[11] Patent Number: 4,514,655
[45] Date of Patent: Apr. 30, 1985

[54] COMPACT CAPACITOR MOTOR WITH THIN COIL CORES

[75] Inventor: Toshiro Hosoya, Tokyo, Japan

[73] Assignee: Tobishi Industries Ltd., Tokyo, Japan

[21] Appl. No.: 447,788

[22] Filed: Dec. 8, 1982

[51] Int. Cl.³ .................. H02K 15/02; H02K 15/04
[52] U.S. Cl. .................................. 310/218; 310/216; 310/254; 310/269
[58] Field of Search ............... 29/596; 72/368, 378, 72/373, 377; 310/42, 216–218, 254, 259, 256, 260, 269, 816

[56] References Cited

U.S. PATENT DOCUMENTS

| | | | |
|---|---|---|---|
| 1,114,361 | 10/1914 | Howe | 310/218 |
| 2,323,114 | 6/1943 | Bradford et al. | 310/218 |
| 3,061,746 | 10/1962 | Hansen | 310/90 |
| 3,513,684 | 5/1970 | Price | 72/377 |
| 3,831,268 | 8/1974 | Boyd et al. | 310/216 |

*Primary Examiner*—William H. Beha, Jr.
*Assistant Examiner*—D. L. Rebsch
*Attorney, Agent, or Firm*—Lowe, King, Price & Becker

[57] ABSTRACT

A small capacitor motor comprises a rotor, a stator core disposed in concentric relationship with the rotor and stator coils wound on the stator core. The stator core comprises a ring-shaped core part, surrounding the core of the rotor and having an axial thickness substantially equal to the axial thickness of the core of the rotor. A plurality of coil winding core parts each radially extends from the periphery of the ring-shaped core part and has an axial thickness less than the axial thickness of the ring-shaped core part. The stator coils are mounted on these radial extensions.

3 Claims, 13 Drawing Figures

COMPACT CAPACITOR MOTOR WITH THIN COIL CORES

BACKGROUND OF THE INVENTION

1. Field of the Invention

The present invention relates to small capacitor motors including synchronous and asynchronous machines.

2. Description of the Prior Art

Generally, with respect to machines and equipment used in the fields of electrical communications, business, instrumentation, etc., many efforts are going into making a whole machine or equipment smaller, lighter, and less power consuming through the improvement of its parts with respect to materials and structures used, and hence also for electric motors used for such machines and equipment, similar requirements are naturally applied. Prior art small a.c. motors which have been used in the above described applications are shaped-pole and capacitor motors having a shaft output below about 20 watts. In particular, capacitor motors are used more frequently than shaded-pole motors when both compactness and large output are required, because the capacitor motor can be easily made to have a shaft output larger than that of the shaded-pole motor. Even for the capacitor motor, however, there is a limit in reducing size; particularly, for the prior art structure the reduction of the motor thickness in the direction of the axis of rotation has been limited. For example, FIGS. 1 and 2 of the accompanying drawings are a partially sectional front view and a partially sectional side view generally showing an example of a prior art capacitor motor, wherein a motor 1 of this type has a stator core 2 formed by, laminating in general a number of punched silicon steel plates, a stator coil 3 wound on the core 2, and a rotor 4 disposed within the hollow part of the stator. To keep the amount of magnetic flux required for the gap portion in such a motor, the thickness of the stator core 2 in the axial direction must be at least the same order as that of the rotor core 4. For this purpose, heretofore, silicon steel plates, as best shown in FIG. 2, have been laminated to the thickness equal to that of the rotor core 4A to form the stator core 2, which accepts stator coil 3. To provide desired flux, if the diameter of magnet wire is 0.09 $\phi$ to 0.5 $\phi$ mm, a coil per pole must be wound 1800 to 400 turns. Therefore, it has been said that, in prior art motors, the thickness of the stator portion in the axial direction inevitably increases by the amount occupied by the stator coil relative to the motor's thickness required in the axial direction, so that there was a limit to further reduction in the thickness of the whole motor. However, as a whole, machines and equipment are being made smaller, recently, requirements have been for smaller and thinner motors.

Considering the above described situation, it is an object to provide a small capacitor motor reduced in thickness, as well as size, and further having high performance, such as a large shaft output.

SUMMARY OF THE INVENTION

In accordance with the present invention, the above object is achieved by a small capacitor motor comprising a rotor, a stator core disposed in concentric relationship with the rotor and stator coils wound on the stator core, characterized in that said stator core comprises a ring-shaped core part surrounding the core of the rotor, and having a thickness substantially equal to the thickness of the core of the rotor in the axial direction, and a plurality of coil winding core parts each radially extending from the periphery of the ring-shaped core part and having a thickness less than the thickness of the ring-shaped core part and on which coil winding core parts the stator coils are to be mounted.

In accordance with such an arrangement of the present invention, since the axial thickness of the ring-shaped core part of the stator core is made to be substantially equal to the axial thickness of the rotor core, the amount of flux required at the gap portion for the motor is satisfactorily maintained, and furthermore, since the axial thickness of the coil winding core part of the stator core is made less than that of the ring-shaped core part, when the stator coil is wound on the coil winding core part, the axial dimension of the stator coil may be reduced by the difference between the axial thickness of the ring-shaped core part and the coil winding core part. Consequently, the axial thickness of the whole motor is reduced, that is, making the motor thinner is achievable.

In accordance with a further particular feature of the present invention, in the arrangement of the present invention as described above, the stator core is formed by combining back to back two identically shaped core plates each having at least four radial parts constituting a part of the coil winding core part and a projecting ring part projecting from the inner ends of the radial parts to one side in a direction perpendicular to the radial direction and constituting a part of the ring-shaped core part, in such a way that at least one core plate having at least four radial parts constituting a part of the coil winding core part and a ring part positioned on the inner ends of the radial parts and in the same plane with the radial parts, having the same thickness and constituting a part of the ring-shaped core part, is sandwiched the two core plates, the core plates being formed by stamping out a sheet of plate material and the projecting ring part being formed by swaging the stamped out ring portion.

In accordance with such a particular feature of the present invention, the iron loss of the stator core may be minimized and a very thin motor whose shaft output is large may be obtained.

DETAILED DESCRIPTION OF THE PREFERRED EMBODIMENTS

With reference to FIGS. 3 to 13 of the accompanying drawings, the present invention will now be described in more detail with respect to an embodiment of the invention.

Figure 6:
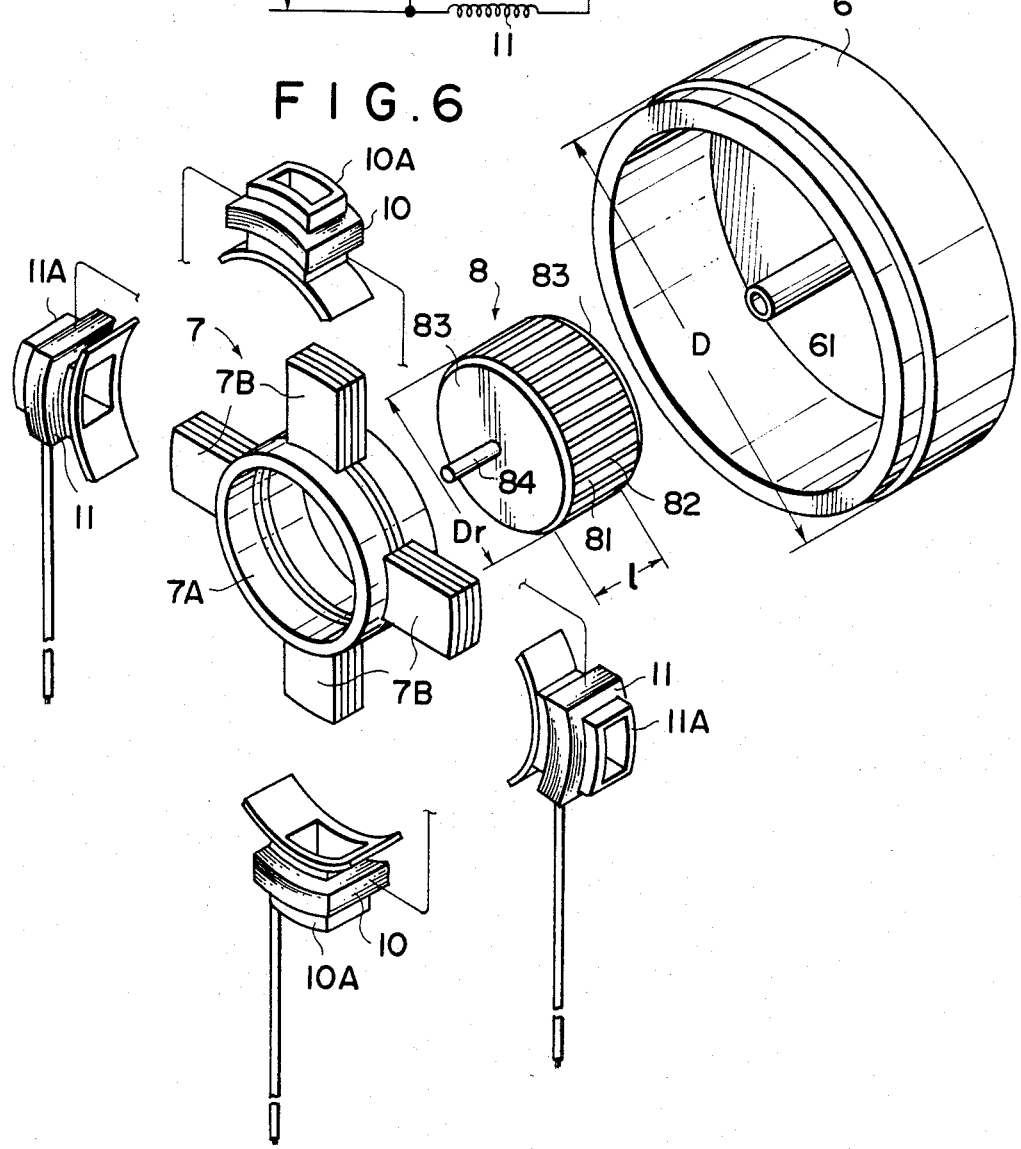
FIG. 6 is an exploded parts arrangement perspective view of the motor in FIGS. 3 and 4.

An electrical motor 5 includes a frame 6, a stator core 7 forced into and fixed to the frame 6 by cementing and/or clamping and a rotor 8 disposed within the hollow portion of the stator core 7 and concentrically with the stator core 7. As shown in FIG. 6, the rotor 8, which itself may be any conventional type, consists of a rotor core 81, aluminum bars 82, aluminum rings 83, and a rotating shaft 84. The rotor 8 is rotatably supported in a sleeve 61 provided to the frame 6, through ball bearings or oilless metal 9 by the rotating shaft 84.

Figure 4:
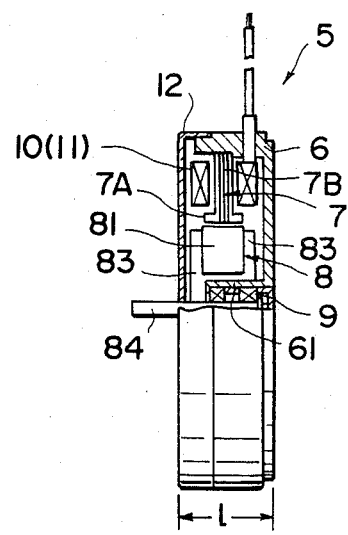
Figure 5:
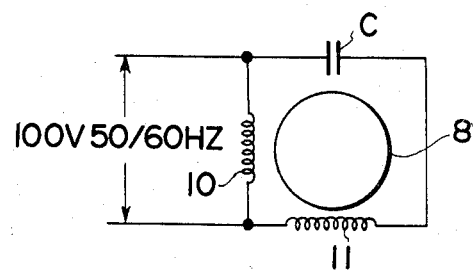
FIG. 5 is a electrically equivalent circuit diagram of the motor in FIGS. 3 and 4.

The stator core 7 is provided with the stator coils 10, 10 and 11, 11, the stator coil 10 being a main winding, as shown in the equivalent circuit of FIG. 5, and the stator coil 11 being an auxiliary winding which is connected across the main winding through a capacitor C. In accordance with the present invention, as best shown in FIGS. 4 and 6, the stator core 7 surrounds the core 81 of the rotor 8 and has a configuration comprising a ring-shaped core portion 7A having the thickness substantially equal to the thickness 1 of the core 81 in the axial direction and four coil winding core parts 7B radially extending from the periphery of the ring-shaped core part 7A, having the thickness less than that of the ring-shaped core part and for winding the stator coil 10, 11. In this embodiment, in accordance with the specific feature of the present invention, the stator core 7 is constructed by the combination of two first core plates 71 having one shape and two second core plates 72 having another shape, as shown in an exploded parts arrangement perspective view of FIG. 7. Each of the first core plates 71 has four radial parts 71B constituting a part of the coil winding core part 7B and a projecting ring part 71A projecting from the inner ends of the radial parts 71B to one side in a direction perpendicular to the radial direction and constituting a part of the ring-shaped core part 7A. Preferably, the core plates 71 are formed by stamping out a sheet of plate material and the projecting ring part 71A is formed by swaging the stamped out ring portion. Each of the core plates 72 has four radial parts 72B forming a part of the coil winding core part 7B and a ring part 72A being positioned on the inner ends of the radial parts 72B and in the same plane with the radial parts 72B, having the same thickness as that of the radial parts 72B and constituting a part of the ring-shaped core part 7A. The core plate 72 is preferably formed by stamping out a sheet of plate material. As materials for making these core plates 71, 72, depending on the selling prices and required performances of motors, general rolled steel plates (such as JIS G3131, 3141), electromagnetic soft ion plates (such as JIS C 2504), and furthermore, if permitted in the light of cost, Fe-Co-V alloy plates, which are said to be the highest class material, may be used.

Figure 7:
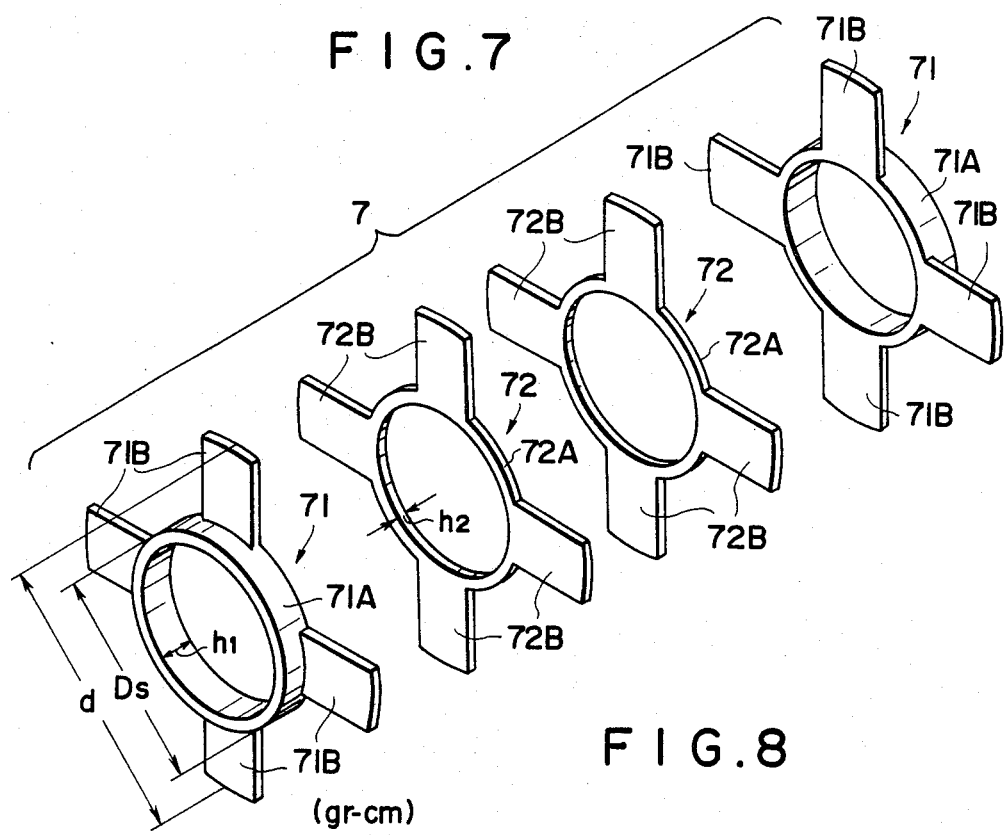
FIG. 7 is an exploded parts arrangement perspective view of the stator core of the motor in FIGS. 3 and 4.

The stator core 7 is formed as shown in FIG. 6 by combining back-to-back two core plates 71 as shown in FIG. 7 with two core plates 72 sandwiched between.

Therefore, in FIG. 7, the thickness $h_1$ of the projecting ring part 71A and the thickness $h_2$ of the ring part 72A should be selected so that $(2h_1+2h_2)$ becomes substantially equal to the thickness 1 of the core 81 of the rotor 8 in FIG. 6.

While, in this embodiment, two core plates 72 are sandwiched, the present invention is not limited by the number of plates. The increase of the number of plates is preferable to increase the shaft output because it results in the reduction of iron loss in the stator, and, in contrast with this, if the degradation of the performance such as shaft output is permissible, the number of core plates 72 may be one, or the core plate may be omitted and the stator core may be formed only by two core plates 71. Furthermore, while, in the embodiment described above, the stator core 7 was formed by the core plates 71, 72 stamped out from a sheet of plate material, if some degradation of performance is permissible, the stator core 7 may be formed by making the ring-shaped core part 7A of the stator core 7 as a separate body and securing by an appropriate method such as welding the coil winding core parts 7B, which are again made as a separate bodies, around the ring-shaped core part 7A. Furthermore, while, in the embodiment described above, four coil winding core parts 7B for the stator core 7 are provided, the present invention is not limited to this, but may use any number of the coil winding core parts 7B in response to the desired number of poles of the motor.

For the stator coils 10, 11, which are wound on the coil winding core parts 7B of the stator core 7, in the illustrated embodiment, coils 10, 11 are wound on the bobbins 10A, 11A, respectively, as shown in FIG. 6, and after the combinations of coil and bobbin are finished with a varnish treatment, the bobbins 10A, 11A are mounted on and fixed to the respective corresponding coil winding core parts 7B. Hoever, not limited to this, in the present invention, the coils 10, 11 may be directly wound on the coil wound core parts 7B on which resin (for example, epoxy resin) coating is effected. In any case, since the thickness of the coil winding core parts 7B is made less than that of the ring-shaped core parts 7A, the outer thickness of the stator coils 10, 11 can be made less than that of the prior art, and hence the motor itself can be made smaller.

Now, an example of the actual motor manufactured in accordance with the present invention and an example of the comparison of its performance with that of the prior art motor will be described.

Figure 1:
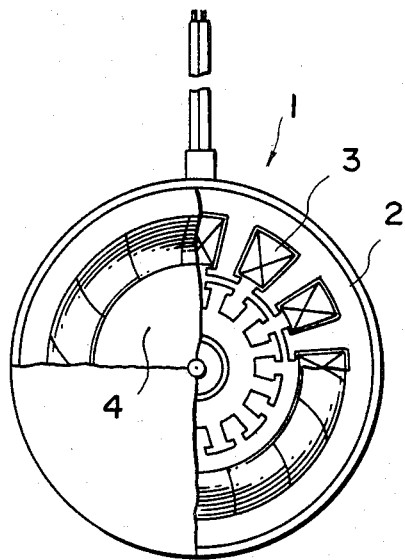
FIGS. 1 and 2 are a partially sectional front view and a partially sectional side view, respectively, generally showing an example of a prior art capacitor motor.
Figure 2:
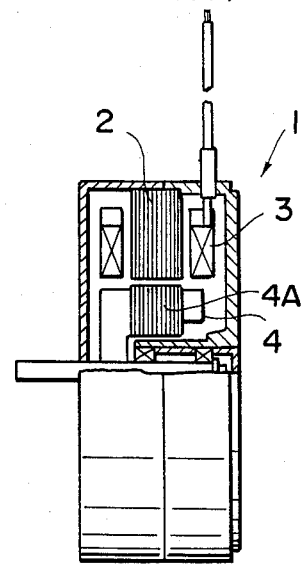
Figure 3:
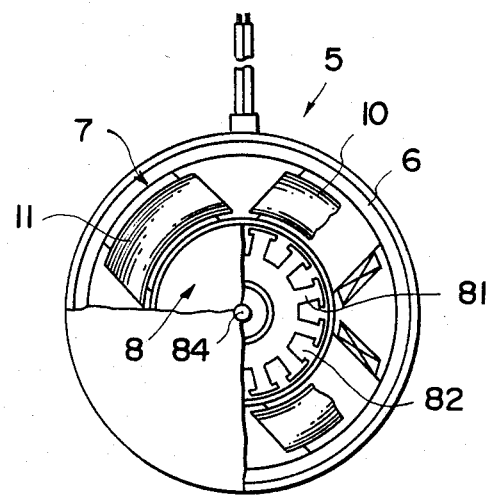
FIGS. 3 and 4 are a partially sectional front view and a partially sectional side view, respectively, generally showing an embodiment of a small capacitor motor in accordance with the present invention.
Figure 8:
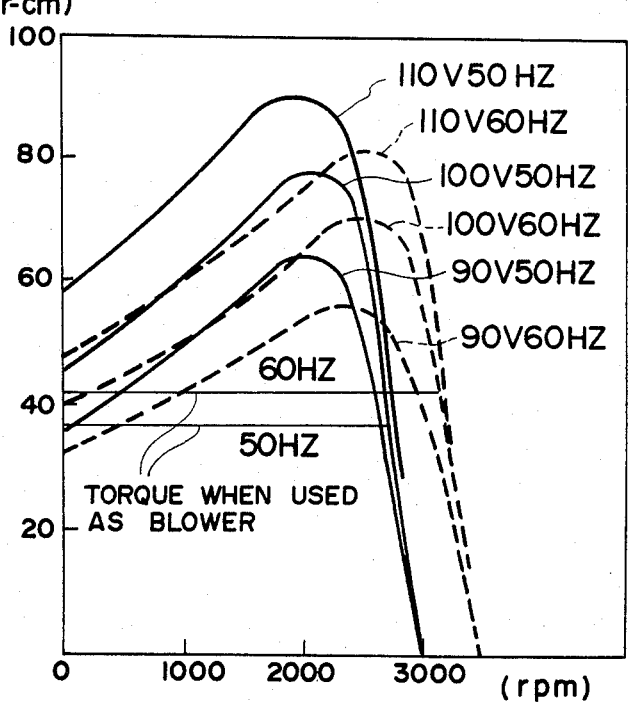
FIG. 8 is a diagram showing an example of the torque-speed characteristic of the motor in accordance with the present invention.

A rotor was manufactured in a conventional manner whose rotor core has the axial thickness (the dimension 1 in FIG. 6) of 8 mm and the outer diameter (the dimension $D_r$ in FIG. 6) of 26.8 $\phi$ mm. The core plates 71 and 72 as shown in FIG. 7 were made by stamping out from a general rolled steel plate of 1.0 mm thick. With respect to the core plates 71 and 72, their ring-shaped parts 71A and 72A had the diameter (the dimension Ds in FIG. 7) of 27 $\phi$ mm, their projecting ring parts 71A the thickness (the dimension $h_1$ in FIG. 7) of 4 mm, and their core plates the total length of projecting parts 71B, 72B of plates 71, 72, respectively (the dimension d in FIG. 7) of 50 $\phi$ mm. The stator core 7 was formed by arranging two core plates 71 back to back with the core plates 72 sandwiched between. The stator was constructed by winding a magnet wire of 0.12 $\phi$ mm in diameter on each of the bobbins 10A, 11A, which are separately formed, 1700 turns, finishing the wire wound bobbins by a varnish treatment, and then mounting the bobbins on the coil winding core parts 7B. The motor 5 was constructed by mounting the rotor 8 on the sleeve 61 of the frame 6 (the outer diameter corresponding to the dimension D in FIG. 6 is 56 φ mm), forcing the stator into the frame 6, and then fitting the cover plate 12 (see FIG. 4) on the frame 6. The resultant motor had the axial thickness (the dimension L in FIG. 4) of 18 mm. The torque-speed characteristic of this motor (56 φ × 18 L) was as shown in FIG. 8, and the electrical characteristic was as shown in the row for motor (56 φ × 18 L) of Table 1. On the other hand, the torque-speed characteristic of the conventional motor (its similar dimension is 58 φ × 28 L) constructed into a configuration as shown in FIGS. 1 and 2 by the use of a silicon steel plate is shown in FIG. 9, and the electrical characteristic is shown in the row of motor (58 φ × 28 L) of Table 1.

TABLE 1

| Motor | Voltage | Current | Power | Shaft output | Rotational Frequency | Temperature rise of windings | Noise |
|---|---|---|---|---|---|---|---|
| 56φ × 18 L | 100 V/ 50 Hz | 0.095 A | 7.2W | 0.8W | 2820 rpm | 40° C. | 37 phon |
| 58φ × 28 L | 100 V/ 50 Hz | 0.0105 | 8.2 | " | 2800 | 38 | 37.5 |

Figure 9:
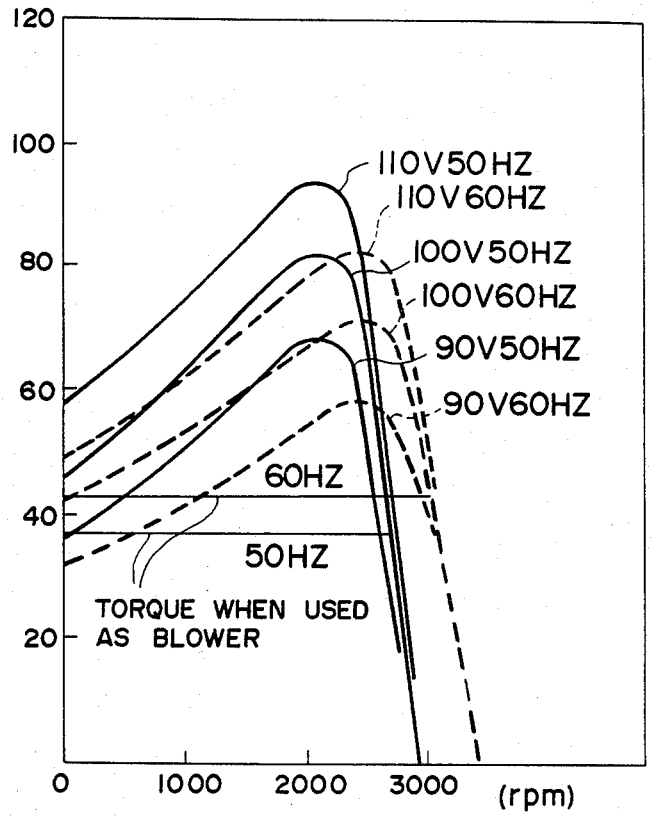
FIG. 9 is a diagram showing an example of the torque-speed characteristic of the prior art motor.
Figure 10:
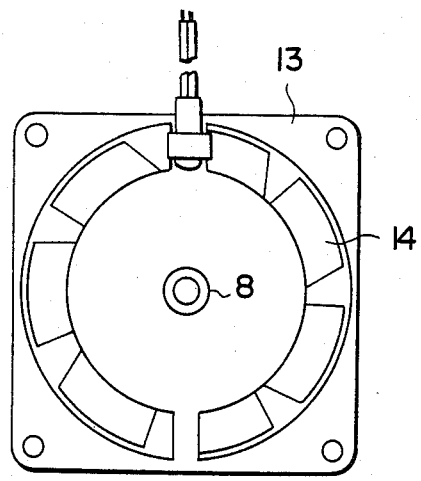
FIGS. 10 and 11 are a front and a side view, respectively, schematically showing an example of an axial flow blower using the motor of the invention.
Figure 11:
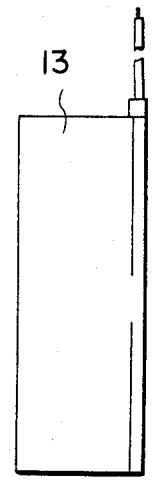

As is apparent from FIGS. 8 and 9 and Table 1, the motor in accordance with the present invention had substantially similar characteristics to those of the conventional type of motors in spite of the use of the general rolled steel plate, and the results were satisfactory.

The magnetic flux densities of various parts of the magnetic path of the motor in accordance with the present invention were as follows:

| mean gap flux density | Bg = 3,000 |
|---|---|
| stator pole part | Bst = 14,500 |
| stator ring-shaped core part | Bsg = 4,700 |
| frame yoke part | Bfg = 10,500 |
| rotor yoke part | Brg = 15,000 |
| rotor teeth part | Brt = 16,700 |

Figure 12:
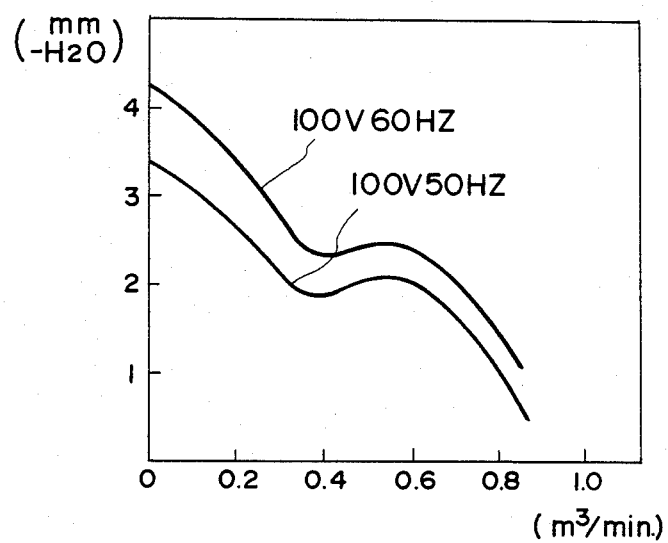
FIG. 12 is a diagram showing an example of the static pressure-air volume characteristic of the axial flow blower in FIGS. 10 and 11.
Figure 13:
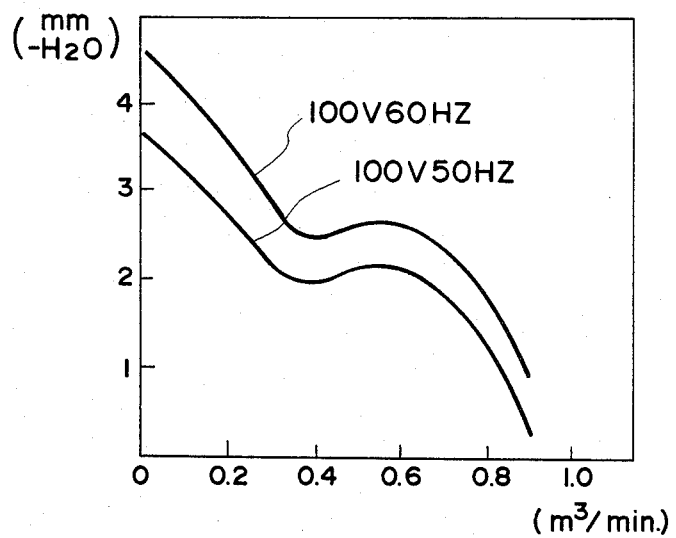
FIG. 13 is a diagram showing an example of the static pressure-air volume characteristic of a blower similar to the axial flow blower in FIGS. 10 and 11.

In the case where the above described motor in accordance with the present invention was mounted on a frame body 13 with a fan 14 attached on the rotor 8 to use as an axial flow blower (in this case the outer dimension of the frame body becomes 80☐ mm.), a static pressure-air volume characteristic as shown in FIG. 12 was obtained. In the other hand, in the case of a blower (80☐ × 25$^L$) constructed in a similar manner using the conventional type of motors as shown in FIGS. 1 and 2, the static pressure-air volume characteristic as shown FIG. 13 was obtained. Comparing FIGS. 12 and 13, it is known that the static pressure-air volume characteristic of the motor using the motor in accordance with the present invention is comparable to the static pressure-air volume characteristic of a blower using the thick motor of the conventional type.

In the above described motor in accordance with the present invention, core plates 71 and 72 were fabricated by general rolled steel, and hence a plate of 1.0 mm thick were used. Consequently, the substantial thickness of the stator core part became 2×2 mm, that is, 4 mm. However, since, if Fe-Co-V alloy plates are employed as constituent material of such a core plate, the desired performance can be achieved even though its thickness should be further reduced, the substantial thickness of the stator core may be further decreased.

Additionally, as an example to which the present invention is applied, there may be a very thin d.c. brushless motor wherein the rotor structure of the motor of the above described embodiment is replaced by permanent magnets magnetized in a direction perpendicular to the shaft and the stator coils are wound in conformity with the driving circuit therefor. Furthermore, while in the embodiment described above, the case where the motor was applied to an axial flow blower has been described, the motor in accordance with the present invention is not limited to this, but it may be used for a very thin centrifugal blower and the like.

I claim:

1. A small capacitor motor comprising a rotor, a stator core disposed in concentric relationship with the rotor and stator coils wound on the stator core, wherein said stator core comprises:

a ring-shaped core part surrounding the core of the rotor and having an axial thickness substantially equal to the axial thickness of the core of the rotor and a plurality of coil winding core parts, each radially extending from the periphery of the ring-shaped core part and having an axial thickness less than the axial thickness of the ring-shaped core part and on which coil winding core parts the stator coils are to be mounted;

said stator core comprising two back to back identically shaped core plates, each having a plurality of radial parts constituting one half of said plurality of coil winding core parts and a projecting ring part projecting from the inner ends of said radial parts to one side in a direction perpendicular to the radial direction and constituting one half of said ring-shaped core parts.

2. A small capacitor motor comprising a rotor, a stator core disposed in concentric relationship with the rotor and stator coils wound on the stator core, wherein said stator core comprises:

a ring-shaped core part surrounding the core of the rotor and having an axial thickness substantially equal to the axial thickness of the core of the rotor and a plurality of coil winding core parts, each radially extending from the periphery of the ring-shaped core part and having an axial thickness less than the axial thickness of the ring-shaped core part and on which coil winding core parts the stator coils are to be mounted;

said stator core comprising two back to back identically shaped core plates, each having a plurality of radial parts constituting a part of said plurality of coil winding core parts and a projecting ring part projecting from the inner ends of said radial parts to one side in a direction perpendicular to the radial direction and constituting a part of said ring-shaped core parts, further comprising at least one core plate having a plurality of radial parts constituting a part of the coil winding core part and a ring part positioned on the inner ends of said radial parts and in the same plane with said radial parts, having the same thickness therewith and constituting a part of said ring-shaped core part, sandwiched between said two core plates.

3. A compact capacitor motor as claimed in claim 1 or 2 wherein the number of said coil winding core parts is at least four.

* * * * *